United States Patent [19]

Gancarz

[11] Patent Number: 5,070,684
[45] Date of Patent: Dec. 10, 1991

[54] LEAF GATHERER AND DISPOSAL APPARATUS

[76] Inventor: Robert M. Gancarz, 98 Szetela Dr., Chicopee, Mass. 01013

[21] Appl. No.: 626,527

[22] Filed: Dec. 12, 1990

[51] Int. Cl.⁵ .............................................. A01D 51/00
[52] U.S. Cl. ..................................... 56/16.6; 56/328.1
[58] Field of Search ................. 56/16.4, 16.6, 400.08, 56/328.1; 15/104.5, 78, 79.1

[56] References Cited

U.S. PATENT DOCUMENTS

| | | | |
|---|---|---|---|
| 3,888,370 | 6/1975 | Gamblin | 56/328.1 |
| 4,077,194 | 3/1978 | Livingston | 56/328.1 |
| 4,434,011 | 2/1984 | Moore | 56/328.1 |
| 4,561,240 | 12/1985 | Moore et al. | 56/328.1 |

*Primary Examiner*—Thuy M. Bui
*Attorney, Agent, or Firm*—Ross, Ross & Flavin

[57] ABSTRACT

Apparatus for retrieving objects from the ground has a ground-engageable drum rotatably mounted on an axle extending between opposite side plates, the drum having a plurality of drum fingers extending radially outwardly from the drum for piercing the objects as the drum is pushed over the ground, and a slotted comb oriented for the in seriatim passage of the drum fingers through respective slots of the comb as the drum is rotated for dislodging the objects as the drum fingers are pulled away therefrom.

2 Claims, 2 Drawing Sheets

LEAF GATHERER AND DISPOSAL APPARATUS

BACKGROUND OF THE INVENTION

Apparatus for picking up fallen leaves and bagging them, thus, saving the typical home owner the laborious chore of raking and bagging his leaves.

1. FIELD OF THE INVENTION

The machine envisioned is for advancing over the ground in a debris-collecting mode. A pick-lined drum is rotatable about an axis as the drum is advanced forwardly relative to the ground by means of an operator pushing the machine or by means of being pulled by a tractor. The debris pick-up means include a plurality of blades arranged upon the drum in a radially outwardly projecting manner and spaced from each other in the axial direction. A debris removing stripper functions to strip the debris from the blades. A removable bag is supported adjacent and rearwardly of the drum and defines a debris confining chamber.

2. DESCRIPTION OF THE PRIOR ART

Known prior art devices are of the motorized type dictating, additional to the motor, the interconnecting means for rotating the usual reel type construction such as gears, belts and like contrivances.

Lawn and parking ot sweepers of the cylindrical rotary brush type are known, and their capability for collecting grass cuttings, leaves and debris is well understood.

Such sweepers heretofore known have the certain disadvantage that the cylindrical sweeping element must be rotated quite rapidly in order to throw the collected debris into the collecting medium.

Such devices usually employ a power unit incorporated into the machine or pulled by a tractor or otherwise driven.

In known prior art devices, a rotating drum is provided having upstanding or projecting bristles or tangs. The drum in each case is observed to rotate faster than the ground passing therebeneath due to the mechanical contrivance, be it wheels, belts, or gearing, which gives to the drum a higher rotating velocity in providing the associated sweeping or raking action.

The distinguishing difference between these prior art machines and the apparatus hereof is that the drum with its rigid picks is rotated at the same velocity as the ground therebeneath for the obvious reason that it is the ground which serves to give the drum its rotational movement.

The other salient difference lies in the fact that the prior art machines employ bristles or tangs which merely sweep or push the product along whereas the rigid picks of the invention stab or penetrate through the product so as to lift it upwardly.

SUMMARY OF THE INVENTION

The device is pushed like a lawn mower over the lawn where leaves have fallen and accumulated. The pushing action rotates a cylindrical drum which mounts a myriad number of protruding nail-like picks which "pick" the leaves. The leaves stay on the picks and are rotated toward a comb positioned so as to achieve the removal of the leaves from the picks by a combing action. The leaves accumulate behind the comb and are caught in a collecting bin or bag. A baffle, in line with the comb, prevents the leaves from escaping out of the bag. The comb and baffle are held rigidly in place by a frame which also mounts a skid plate for the resting of the bin or bag thereupon.

The skid plate serves as a support so as to preclude the bin or bag from being pulled or otherwise upset as well as from being torn as when and if passing over sharp articles lying in or on the lawn.

Further, the bag is mounted relative to the frame in manner so as to be easily removed therefrom when the bag becomes filled.

BRIEF DECRIPTION OF THE DRAWINGS

DESCRIPTION OF THE PREFERRED EMBODIMENT

Figure 1:
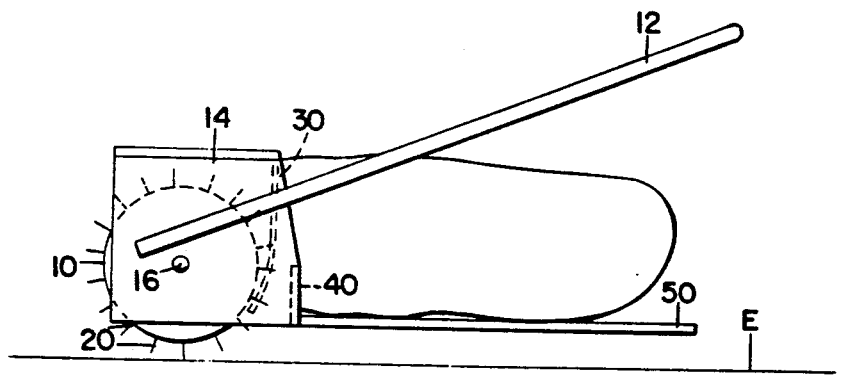
FIG. 1 is a view, in side elevation, of the apparatus of the invention.
Figure 2:
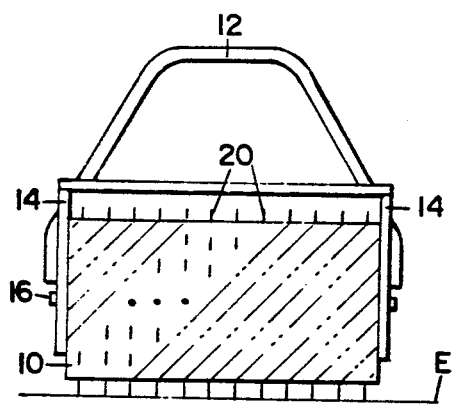
FIG. 2 is a view, in front elevation, of the FIG. 1 apparatus.
Figure 3:
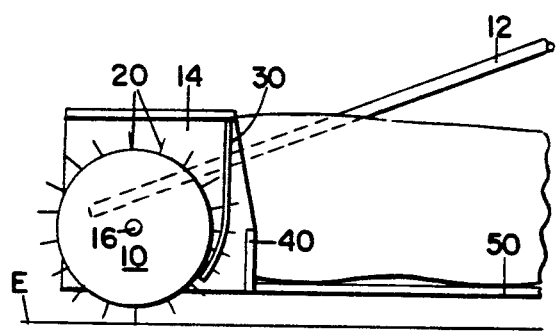
FIG. 3 is a broken view, in side elevation, of the FIG. 1 apparatus, with the leftward side plate removed.
Figure 4:
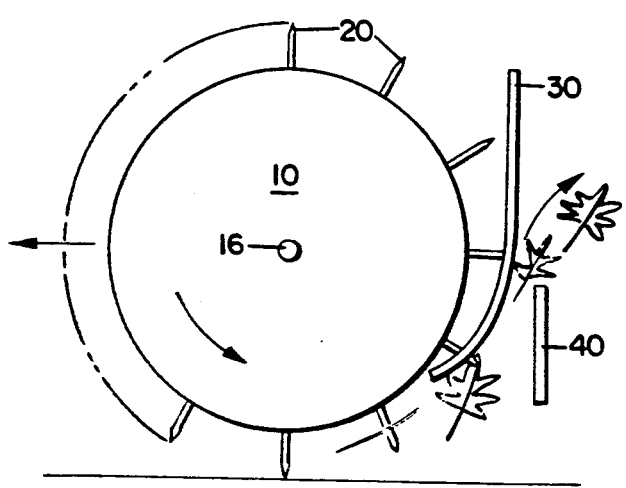
FIG. 4 is a large scale schematic view showing the drum, comb, and baffle in their related operating positions.
Figure 5:
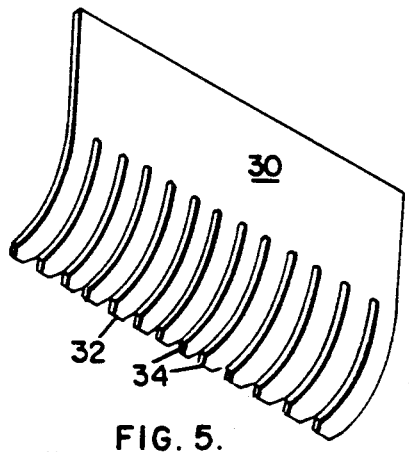
FIG. 5 is a view, in perspective, of the comb of the invention.

The push type lawn comber of the invention will now be described in detail.

The cylindrical drum 10 rides over the ground so as to be rotated as it is pushed by an operator through the means of a rearwardly extended push type handle 12 which is of substantially U shape in configuration and having each opposite terminus fixed to a respective side plate 14, with the drum being journalled upon each side plate by way of a transverse drum shaft or drum axle 16.

The drum is shown as being of one piece configuration, but it could be made up of a plurality of wheels or disclike arrangements dispersed in a side by side manner as to each other so as to allow a tighter turning radius, in the well-known manner.

Drum 10 is provided with a series of spaced helically arranged rows of picks 20 and as will be appreciated move or orbit in spaced circular paths as the drum is rotated.

The picks are of such length and of such strength as to support the drum upwardly of the earth E over which it is passed in operational use.

The picks may be of rigid or flexible type so long as they are sufficiently strong to pierce the leaves during operational use.

As aforesaid, the arrangement has the advantage that it is not encumbered by belting, wheels, gearing or the like, the entire motion power being supplied by the operator in pushing the apparatus.

This much having been described, reference is now made to the FIGS. 6-9.

Figure 6:
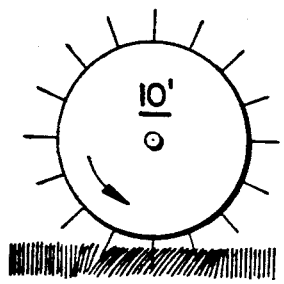
FIG. 6 is a schematic showing of a prior art device for explaining the difference between it and the device of the invention insofar as function is concerned.

In FIG. 6, a drum 10' of the prior art is disclosed wherein the rotation thereof is counterclockwise and at a rate greater than the ground rate, and it will be observed that the grass is pushed or laid down in the rotational direction.

Figure 7:
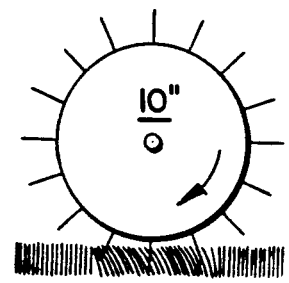
FIG. 7 is similar to FIG. 6, differing therefrom in that in this showing the reel is shown as being rotative in a clockwise direction.
Figure 8:
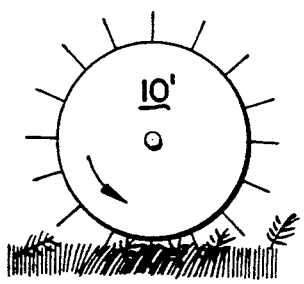
FIG. 8 is a schematic showing the prior art drum of FIG. 6 and its method of sweeping or pushing the leaves.

In FIG. 7, a drum 10" of another prior art device is disclosed wherein the rotation thereof is clockwise and at a rate greater than the ground rate. Here again the grass will be observed to be pushed or laid down in the rotational direction of the drum.

In the present case, the CCW rotation rate is equal to the ground rate wherefor the grass is not pushed, but rather is allowed to remain erect.

In the FIG. 8 showing, I again disclose the FIG. 6 prior art drum 10' and show its capability of sweeping or otherwise pushing the leaves in the direction of the rotation of the drum.

Figure 9:
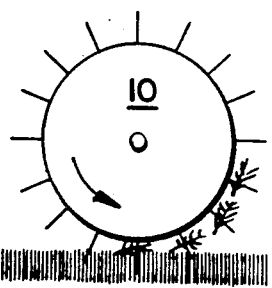
FIG. 9 is a schematic showing the drum of the invention and its capacity for puncturing or stabbing the leaves.

In the FIG. 9 showing, I show drum 70 of the invention with its capability of picking up leaves by the program of stabbing or puncturing the leaves with the picks so that they are carried therewith to the next stage of the program.

Reverting back again to the first sheet of the drawings, I have shown a slightly upwardly concaved stripping comb 30 which may be formed from a resilient material such as a thin metal or plastic, the comb being slotted upwardly from its lowermost edge 32, with a plurality of spaced slots 34 through which the respective aligned picks are passed as the drum is rotated.

The comb is mounted in substantially vertical disposition with its opposite side edges being fitted to the adjacent side frame 14 by suitable fitting means so that the comb extends relative to a generatrix of the drum surface at its lower ascending quadrant.

Rearwardly of the comb and spaced therefrom, a vertical extending baffle 40 is projected upwardly, being supported by and mounted on the forward end face of a horizontally rearwardly extending skid plate or sled 50, both baffle and skid plate being extended transversely across the apparatus width and both being suitably supported by and mounted relative to the opposite side plates.

A debris confining chamber in the form of a bag receives debris collected on the picks of the drum and entrapped by a comb as the picks are withdrawn therefrom.

Each increment of debris is handled only once as it is penetrated by a pick, entrapped by a cooperant comb as the pick is pulled away from the increment, which increment then being freed is allowed to be released from its entrapped position in the comb and to be dropped into a collecting medium.

Figure 10:
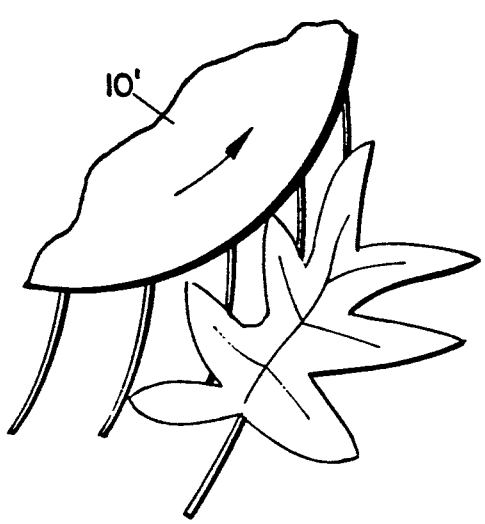
FIG. 10 is a schematic of a prior art apparatus where the leaf is being pushed and swept by bristles or tangs.
Figure 11:
FIG. 11 is a schematic of the drum of the invention showing a leaf stabbed by the drum picks.

Now with reference to FIGS. 10 and 11, it is to be explained that the FIG. 10 showing is of a prior art apparatus where the leaf is being pushed as the drum is rotated in the CCW direction.

Contrariwise, the FIG. 11 showing of the feature of this invention, the leaf is showing as having been stabbed by various picks of the drum.

By the sweeping or raking function as found in the prior art, such machines do not damage the crop, be it corn or straw or beans or leaves or whatever, it being the intended desideratum not to damage the crop by the piercing or stabbing function.

Contrariwise, with the invention hereof, the leaves, once stabbed or pierced, must be lifted or removed from the picks by the combing action of the cooperant comb, the comb in effect holding the leaf in an engaged or trapped position until the drum is rotated further so that the pick is pulled out of and away from the leaf.

The debris is brought upwardly from the ground and is entrapped in the one or more of the slots of the comb. Continued rotation of the drum draws the respective picks away from their penetrating positions and as they do, the leaves are dropped into the bag.

I claim:

1. In an apparatus for retrieving objects from the ground, the apparatus having a ground engageable rotatable drum mounted on an axle extendable between opposite side plates and having a plurality of drum fingers extending radially outwardly from the drum for piercing the objects as the drum is rotated by virtue of its being pushed over the ground by means of a handle manipulated by an operator, and a slotted comb being oriented for the in seriatim passage of the fingers through the slots as the drum is rotated for the entrapment of the objects as the drum fingers are pulled away therefrom.

2. An apparatus for advancing over the ground in a debris-collecting function comprising:
   a housing,
   a pick-lined drum supporting the housing and being rotatable about an axis as the drum and housing are advanced relative to the ground,
   debris pick-up means including a plurality of picks arranged upon the drum in a radially outwardly projecting manner and spaced from each other,
   means disposed within the housing to define a debris removing stripper,
   a removable bag supported adjacent and rearwardly of the housing and definig a debris confining chamber,
   the picks advancing the debris rearwardly to the debris removing stripper for removal from the picks and deflection into the bag.

* * * * *